NILS O. LINANDER
INVENTOR
BY Wenderoth, Lind & Ponack
ATTORNEYS

United States Patent Office 2,791,285
Patented May 7, 1957

2,791,285

CONTROL CONDUIT MOUNTING IN DRIVE SHAFT OF EXCAVATING MACHINES

Nils Otto Linander, Malmo, Sweden, assignor to Aktiebolaget Akermans Gjuteri & Mekaniska Verkstad, Eslov, Sweden, a corporation of Sweden Application December 3, 1953, Serial No. 395,924

Claims priority, application Sweden December 13, 1952

1 Claim. (Cl. 180—6.58)

This invention relates to excavating and like machines having a sub-frame supported on, and movable by means of, endless tracks or wheels, and a machine body which is pivotally connected with the sub-frame and in which the power source of the machine and a source of pressure medium are disposed, the motive power for the endless tracks or wheels operable by means of steering clutch mechanisms controlled by pressure medium being transmitted from the machine body to the sub-frame by a drive shaft concentric with the axis of pivoting of the machine body and the sub-frame and pressure medium for the steering clutch mechanisms being led through the drive shaft. The invention is characterized in that the pressure medium is led through the drive shaft with the aid of two tubes which are preferably non-rotatably interconnected and concentric with each other and with the drive shaft and located in a bore provided in the drive shaft, said tubes having their one ends rotatably connected with a coupling member which is mounted in the drive shaft together with the outer one of said two tubes.

The principal object of the invention is to provide a simple and useful communication for the pressure medium between the source of pressure medium in the machine body and the steering clutch mechanisms in the sub-frame in order to permit unlimited pivoting of the machine body in relation to the sub-frame.

Further objects and advantages of the invention will become apparent from the following description, reference being had to the accompanying drawings illustrating a preferred embodiment of the invention. In the drawings.

Figure 1:
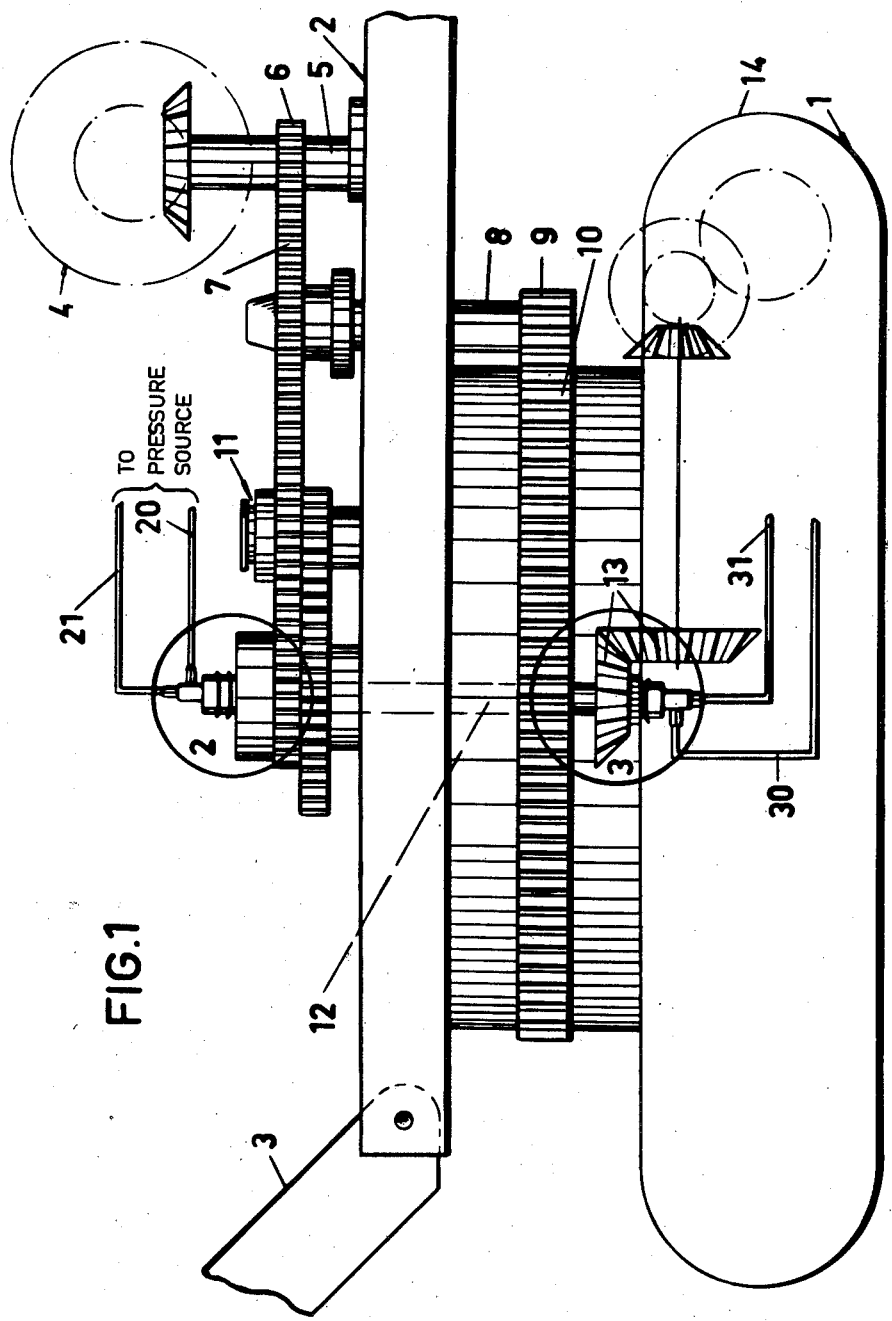
Fig. 1 is a diagrammatic side view of an excavating machine provided with a device in accordance with the invention.
Figure 2:
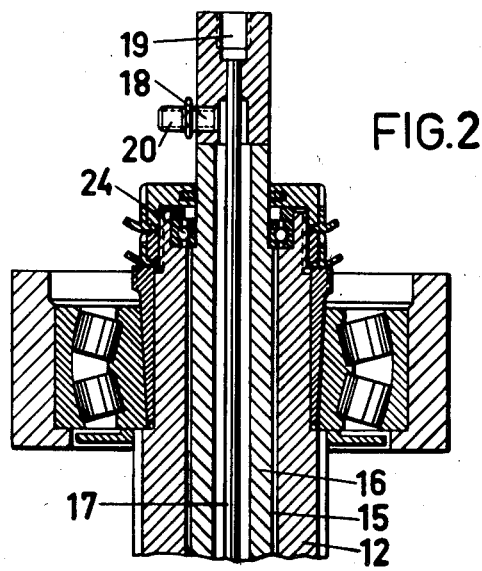
Figs. 2 and 3 are longitudinal sections showing the portions encircled in Fig. 1 and designated II and III, respectively.
Figure 3:
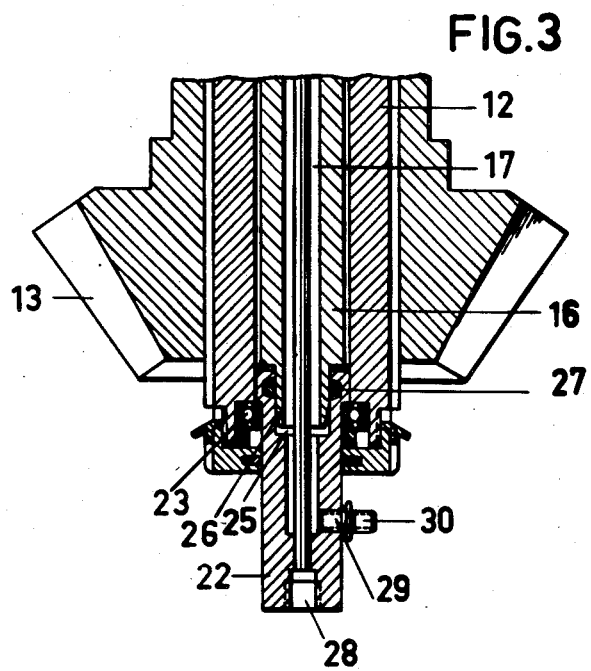

In the drawings, 1 designates the sub-frame and 2 the body of the excavating machine, which parts are pivotally connected with each other for horizontal swinging of an excavating shovel (not shown) which is carried by an arm 3 mounted in the machine body 2 and is also vertically swingable. The machine body 2 is provided with a power source (not shown) which is drivably connected through friction clutches and gears 4 with a vertical shaft 5 which can be driven in two opposite directions and which has a pinion 6 in mesh with a gear 7 secured to one end of a vertical shaft 8, the other end of which carries a pinion 9 in mesh with a gear rim 10 fixed in the sub-frame 1, whereby pivoting of the machine body 2 is made possible in relation to the sub-frame 1. The gear 7 is connected by means of a transmission 11 in driving relation with a drive shaft 12 mounted for rotation in the axis of pivoting of the machine body and the sub-frame. Said drive shaft 12 is connected, by means of a bevel gearing 13 and further transmission means including two steering clutch mechanisms (not shown), in driving relation with endless tracks 14 mounted in the sub-frame and carrying the excavating machine so as to permit moving of the excavating machine. With the aid of the steering clutch mechanisms one of the endless tracks can be disengaged in a known manner from its driving relation with the power source, whereby the machine can be steered in the desired direction. The power source is connected in driving relation with the arm 3 carrying the excavating shovel.

In order that the conduits connecting the source of pressure medium in the machine body with the steering clutch mechanisms in the sub-frame may permit pivoting of the machine body in relation to the sub-frame, the shaft 12 has an axial bore 15 in which two tubes 16 and 17 are located which are concentric with each other and with the shaft 12. The upper ends of the tubes 16 and 17 project from the shaft 12 and are preferably non-rotatably interconnected and communicate through connections 18 and 19 and associated conduits 20 and 21 with the source of pressure medium (not shown). The tubes 16 and 17 have their lower ends inserted in a coupling member 22 which is mounted in the lower end of the shaft 12 with the aid of a ball bearing 23. The tube 16 is mounted in the upper end of the shaft 12 by means of another ball bearing 24. As appears from the drawings, the tube 16 is reduced at its lower end to a smaller diameter in order to form a nozzle 26 which extends into a hollow space 25 provided in the coupling member 22, and which sealingly but rotatably engages said coupling member 22 by means of a gasket 27 located in a groove provided in the wall of the hollow space 25. The tube 17 extends downwardly from said nozzle 26, and in the gradually downwardly tapering hollow space 25 said tube 17 reaches into that portion of said space which has the same internal diameter as the external diameter of the tube which has rotary fit within said portion. The coupling member 22 has a connection 28 which is coaxial with the tube 17, as well as a further connection 29 which extends radially from the side of the coupling member. The steering clutch mechanisms (not shown) each of which is adapted to control one of the endless tracks 14 are connectible with the source of pressure medium by means of conduits 30 and 31, respectively, coupled to the connections 28 and 29. The communication between the source of pressure medium and one of the steering clutch mechanisms is thus formed by conduit 20, connection 18, tube 16, coupling member 22, connection 29, and conduit 30, while the communication between the source of pressure medium and the other steering clutch mechanism is formed by conduit 21, connection 19, tube 17, connection 28, and conduit 31. Said communications thus each form a supply and return conduit for one of the steering clutch mechanisms which thanks to the tubes 16, 17 which are concentric with each other and with the shaft 12 and form part of the conduits, and to the coupling member 22 permit unlimited pivoting of the machine body 2 in relation to the sub-frame 1 as well as rotation of the shaft 12. At the same time they are very robust and thus operating disturbances occur but to a very small extent.

Modifications are conceivable within the scope of the inventive idea such as it is defined in the appendant claim.

What I claim and desire to secure by Letters Patent is:

In a steering mechanism for a traction device having a pair of surface contacting elements, means to drive each of said elements, vertically disposed transmission means for supplying power to said driving means, a body rotatably supported on said surface contacting elements and rotatable relative to said vertical transmission means, a hollow drive shaft in said vertical transmission means, said steering mechanism comprising fluid pressure operated clutch means in said driving means to disengage one or another of said surface contacting elements from said driving means, a source of fluid pressure on said body, and conduits connecting said source with said clutches, that improvement comprising a plurality of concentric fluid pressure carrying tubes fixed relative to the rotatably supported body and concentric within said hollow shaft, the outer tube being rotatably mounted relative to one end of said hollow shaft, a coupling member fixed relative to said surface contacting elements and rotatably connected with the ends of said tubes at the other end of said hollow shaft and having passages therethrough leading from each tube, said coupling member fitting within the end of said shaft and over the ends of each of said tubes, bearing means between said coupling member and said shaft, packing means between said coupling member and the outermost of said concentric tubes, said fluid pressure conduits connected to the ends of said fixed tubes and to said coupling member.

References Cited in the file of this patent

UNITED STATES PATENTS

| | | |
|---|---|---|
| 2,254,192 | White | Aug. 26, 1941 |
| 2,403,519 | Gardiner | July 9, 1946 |
| 2,701,146 | Warren | Feb. 1, 1955 |

FOREIGN PATENTS

| | | |
|---|---|---|
| 744,076 | France | Jan. 21, 1933 |